United States Patent [19]

Harada et al.

[11] Patent Number: 5,690,797
[45] Date of Patent: Nov. 25, 1997

[54] HYDROGEN AND OXYGEN GAS GENERATING SYSTEM

[75] Inventors: Hiroyuki Harada, Tokyo; Takashi Sasaki, Hyogo; Kiyoshi Hirai, Hyogo; Shinichi Yasui, Hyogo; Hiroko Kobayashi, Hyogo; Mamoru Nagao, Osaka, all of Japan

[73] Assignees: Mitsubishi Corporation, Tokyo; Shinko Pantec Co., Ltd., Hyogo, both of Japan

[21] Appl. No.: 588,336

[22] Filed: Jan. 18, 1996

[30] Foreign Application Priority Data

Jan. 18, 1995 [JP] Japan .................................. 7-024737

[51] Int. Cl.$^6$ .......................... C25B 9/00; C25B 15/08
[52] U.S. Cl. .................. 204/229; 204/230; 204/238; 204/239; 204/266
[58] Field of Search .......................... 204/229, 230, 204/238, 239, 266

[56] References Cited

U.S. PATENT DOCUMENTS

| | | | |
|---|---|---|---|
| 3,616,436 | 10/1971 | Haas | 204/230 X |
| 4,002,552 | 1/1977 | Bunn, Jr. | 204/230 X |
| 4,533,451 | 8/1985 | Kumazawa | 204/229 |
| 4,822,469 | 4/1989 | Shimomura et al. | 204/230 |
| 5,037,518 | 8/1991 | Young et al. | 204/230 |

*Primary Examiner*—Donald R. Valentine
*Attorney, Agent, or Firm*—Sughrue,Mion,Zinn,Macpeak & Seas, PLLC

[57] ABSTRACT

A hydrogen/oxygen gas generating system includes a deionized water container and a cell for water electrolysis having anode and cathode compartments, the cell being submerged in deionized water in the container. Oxygen gas generated in the anode compartment is channeled to an oxygen gas separating chamber defined in the container at its top whereas hydrogen gas generated in the cathode compartment is channeled to a gas/liquid separator. The pressures of these gases are detected, and in accordance with the detected gas pressures, a first gas piping line for delivering oxygen gas outward from the oxygen gas separating chamber and a second gas piping line for delivering hydrogen gas outward from the separator are controlled such that the differential pressure between the gases may fall in a limited range. Water level in the oxygen gas separating chamber and water level in the gas/liquid separator are detected, and the detected levels are utilized to control the pressures and the supply of deionized water into the container. The system can generate hydrogen and oxygen gases of high purity under high pressure in a safe manner without a need for gas compressors.

16 Claims, 4 Drawing Sheets

HYDROGEN AND OXYGEN GAS GENERATING SYSTEM

BACKGROUND OF THE INVENTION

1. Field of the Invention

This invention relates to a system for generating hydrogen and oxygen gases of high purity by direct electrolysis of deionized water.

2. Prior Art

Hydrogen and oxygen gases of high purity are useful in film formation steps for forming thin and thick films such as silicon oxide films, CVD films, and epitaxially grown films and heat treatment steps in the semiconductor manufacturing process, for preventing corrosion of coolant water piping lines in nuclear power plants, and for cooling in thermal power plants, as well as in ceramic, fine ceramic and other industrial fields.

In the prior art, hydrogen gas is generally obtained by purifying by-product gases resulting from the petrochemical and soda industries. Hydrogen gas is processed into a convenient form for transportation and storage, for example, by compressing the gas by a compressor to fill a cylinder with hydrogen gas under high pressure or by cooling and liquefying the gas before it is delivered to semiconductor manufacturing facilities for use. However, cylinders filled with pressurized hydrogen gas are hazardous in that the fill pressure itself is dangerous and there is a risk of ignition or explosion due to leakage during transportation or storage. Additionally, when hydrogen gas is filled under high pressure by compressing it by a gas compressor, hydrocarbon impurities can be introduced into the gas from lubricant oil of the compressor. If such hydrogen gas is used in the semiconductor manufacturing industry, hydrocarbon impurities can deteriorate the quality or reduce the yield of semiconductor products.

On the other hand, oxygen gas is generally available as liquefied oxygen by cooling air followed by low-temperature processing. Liquefied oxygen is transported to consumption sites such as semiconductor manufacturing plants and stored as such. On use, liquefied oxygen is allowed to gasify. Alternatively, oxygen gas is filled in cylinders under high pressure which are transported and stored until use. Unlike hydrogen, oxygen is not combustible or explosive by itself, but actively supports combustion to permit even iron and other metals to burn and forms strong explosives when mixed with combustibles. Therefore, like hydrogen, oxygen has a fair chance to create hazard during transportation, storage and use. Since air is used as a source for oxygen gas, airborne hydrocarbons and other impurities can be carried into oxygen gas. Like the hydrogen gas pressurized by a compressor, such contaminated oxygen gas can adversely affect the quality and yield of products in the semiconductor industry.

Many problems arise with respect to the transportation and storage of cylinders filled with hydrogen or oxygen gas under high pressure. Citizens are now more conscious and feel dangerous about the transportation of such hazardous cylinders across city areas or the storage in city areas. In fact, the risk of an accident is considerably high. The transportation cost is increasing. There is a need to have an implement capable of supplying high purity hydrogen or oxygen gas in a stable manner without possible contamination with hydrocarbons, which implement can eliminate risks associated with transportation and storage and reduce the cost of transportation.

As one solution to the safety problem among the above-mentioned problems, it was contemplated convenient and actually employed that an electrolytic apparatus capable of generating hydrogen and oxygen gases through electrolysis of water is installed in a plant where hydrogen and oxygen gases are consumed. Since only necessary amounts of hydrogen and oxygen gases can be generated in the plant only when necessary, this solution eliminates a need for storage and transportation and avoids the danger associated therewith. However, since conventional water electrolyzing apparatus generate a gas under low pressure, in most cases, a gas compressor must be used to pressurize the gas before use. Then the overall facility is increased in size. The actual introduction of the electrolytic apparatus in the plant is disadvantageous from the points of view of installation cost and maintenance service unless the amount of gas consumption is above a certain level. Therefore, only a few plants have water electrolyzing apparatus incorporated in practice. Additionally, the use of a gas compressor raises the problem that lubricant oil for the compressor can be taken into semiconductor and other products as hydrocarbon impurities as previously mentioned. For this and other reasons, semiconductor manufacturers hesitated to introduce electrolytic apparatus in their plants.

With respect to electrolysis of water, it is well known that the pressures of hydrogen and oxygen gases will increase if the amounts of hydrogen and oxygen gases generated exceed the consumption amounts. Then in theory, it must be possible to generate hydrogen and oxygen gases under desired pressures without a need for gas compressors. In conventionally widely used water electrolyzing cells, however, the conventional electrolytic cells cannot be increased in pressure resistance by a choice of material and structure because of restrictions from the strength of electrolyte membranes and sealing properties of cells themselves. In the prior art, there were available no water electrolyzing apparatus capable of generating hydrogen and oxygen gases under desired pressures without a need for gas compressors.

In semiconductor manufacturing plants, for example, hydrogen purifiers utilizing the hydrogen permeability of palladium have been widely used. Although hydrogen purifiers of this type have a maximum service pressure limited to less than 10 atm. so that they may fall outside the high-pressure gas handling regulations, they are usually operated under a higher pressure within the limited range. This is because an increased pressure loss across a palladium permeation cell in a hydrogen purifier allows the expensive palladium permeation cell to be reduced in area, achieving a cost reduction. Water electrolyzing cells using solid polymer electrolyte membranes, on the other hand, have a pressure resistance of about 4 atm. If a water electrolysis cell is used by directly combining it with a hydrogen purifier, the area of a palladium permeation cell in the hydrogen purifier must be increased several folds. This is difficult to implement from the economical point of view. It is then inevitable to interpose a gas compressor, which can give rise to the problems of reduced product quality and yield by hydrocarbon impurities as previously mentioned. The concept of generating hydrogen and oxygen gases in situ by electrolysis of water has never been implemented in semiconductor manufacturing plants.

In order to solve the above-mentioned problems, we devised a hydrogen and oxygen gas generating system comprising a container filled with deionized water and having received therein a water electrolysis cell for generating hydrogen and oxygen gases by electrolysis of water. That is, the arrangement having a water electrolysis cell received in a container filled with deionized water is disclosed in Publication of International Patent Application No. 502908/1988 "Method and Apparatus for Electrolysis of Water," Japanese Patent Publication (JP-B) No. 247591/1989 "Hydrogen Producing System," and Japanese Patent Application Kokai (JP-A) No. 33283/1994 "Hydrogen Generating System."

More particularly, Publication of International Patent Application No. 502908/1988 "Method and Apparatus for Electrolysis of Water" discloses a housing surrounding a cell for water electrolysis. Discharge water from the anode is led to between the housing and the cell. Hydrogen gas can be generated under a somewhat high pressure. A need for a gas compressor is sometimes eliminated. This proposal, however, does not disclose the technique of balancing the pressures on the anode and cathode sides of the water electrolysis cell, exactly stated, the technique of balancing the pressures of hydrogen and oxygen gases. A diaphragm separating the anode and cathode sides, for example, a solid electrolyte membrane can fail if gases are generated under higher pressures than the pressure resistance of the diaphragm. It is then difficult to generate gases under any desired high pressures. Generally in the semiconductor manufacturing field, it is desired to generate hydrogen gas under a high pressure in the range that does not interfere with the high-pressure gas handling regulation, that is, about 10 atm., typically about 9.5 atm. Since known diaphragms such as solid electrolyte membranes have a pressure resistance of about 4 or 5 atm. at most, it is difficult to directly generate hydrogen gas under such a high pressure.

JP-B 247591/1989 "Hydrogen Producing System" discloses that a high pressure pump pumps deionized water into a container or pressure vessel in which a cell for water electrolysis is received. The container has a discharge port with a hydraulic pressure control valve. Deionized water fed into the container by the pump is discharged from the discharge port through the valve so that deionized water in the container may be maintained at a constant pressure. Hydrogen and oxygen gases generated in the electrolytic cell are collected in gas chambers which are defined in an upper portion of the container and divided by a partition in a fluid tight manner to prevent intermixing of gases. The respective gas chambers at lower ends are in contact with deionized water in the container whereby the hydraulic pressure of deionized water is always in balance with the pressures of hydrogen and oxygen gases. With this arrangement, no differential pressure is applied across the diaphragm typically in the form of a solid electrolyte membrane separating the anode and cathode sides. There is no risk of failure of the diaphragm in the cell even when the pressures of hydrogen and oxygen gases are increased. This proposal, however, does not disclose the technique of taking out hydrogen and oxygen gases from the hydrogen and oxygen chambers in the container exactly at a volume ratio of 2:1. If the consumption proportion is not in balance with the generation proportion, one gas which is less consumed increases its volume. Eventually the one gas expands beyond the lower end of the partition where the chambers merge with each other and overflows from its own chamber to the other chamber to form detonating gas. Alternatively, water in the container can flow out through a gas outlet pipe. The system of this proposal is difficult to operate in a stable and safe manner.

The hydrogen generating system of JP-A 33283/1994 includes a water tank forming a water chamber in which a water electrolyzer consisting of a plurality of electrolytic cells is immersed, thereby eliminating the shortage of water supply to the respective cells as occurring when water is fed to the respective cells through a serial piping line. This proposal does not intend to generate hydrogen gas under high pressure and thus has no function of pressure regulation. It is then impossible to generate hydrogen gas under high pressure.

SUMMARY OF THE INVENTION

A primary object of the present invention is to provide a hydrogen and oxygen gas generating system which can generate hydrogen and oxygen gases under high pressures without a need for gas compressors, eliminate the risk of hydrogen and oxygen gases being contaminated with hydrocarbons resulting from gas compressors, and therefore, deliver pressurized hydrogen and oxygen gases of high purity at low cost in a highly reliable manner.

Another object of the present invention is to provide a hydrogen and oxygen gas generating system comprising a deionized water container and a water electrolysis cell immersed therein, which can control the level of water and the pressures of hydrogen and oxygen gases so as to deliver pressurized hydrogen and oxygen gases in a stable and safe manner.

In a first form, the present invention provides a hydrogen and oxygen gas generating system comprising a water electrolysis cell having anode and cathode compartments separated from one another by a diaphragm wherein deionized water is electrolyzed to generate oxygen and hydrogen gases in the anode and cathode compartments, respectively, an oxygen outflow pipe connected to the anode compartment of the electrolytic cell for channeling oxygen gas resulting from electrolysis upward from the anode compartment, a hydrogen outflow pipe connected to the cathode compartment of the electrolytic cell for channeling hydrogen gas resulting from electrolysis outward from the cathode compartment, a container filled with deionized water, surrounding the electrolytic cell and supporting the cell submerged in deionized water, the container including an upper portion defining an oxygen gas separating chamber where an upper end of the oxygen outflow pipe opens, a deionized water feed means for feeding deionized water into the container, the cell further having a communication port at the bottom of the anode compartment for communication of deionized water between the cell interior and the container interior, a gas/liquid separator disposed outside the container and connected to the cathode compartment of the electrolytic cell through the hydrogen outflow pipe for receiving hydrogen gas, a first gas pressure detecting means for detecting the pressure of oxygen gas accumulating in an upper space of the oxygen gas separating chamber, a second gas pressure detecting means for detecting the pressure of hydrogen gas accumulating in an upper space of the gas/liquid separator, a first gas piping line for delivering outward the oxygen gas accumulating in an upper space of the oxygen gas separating chamber, a second gas piping line for delivering outward the hydrogen gas accumulating in an upper space of the gas/liquid separator, a gas pressure control means for controlling the first and second gas piping lines in accordance with the values of gas pressure detected by the first and second gas pressure detecting means, to control the pressure of oxygen gas accumulating in an upper space of the oxygen gas separating chamber and the pressure of hydrogen gas accumulating in an upper space of the gas/liquid separator, a DC power source for supplying electric power to the electrolytic cell, and a power regulator coupled to the DC power source for controlling the power supply to the electrolytic cell so that the pressure of hydrogen gas and the pressure of oxygen gas may reach predetermined pressure values.

In the hydrogen and oxygen gas generating system of the first form, oxygen gas generated in the anode compartment of the electrolytic cell is channeled along with deionized water to the oxygen gas separating chamber near the top of the container through the oxygen outflow pipe and accumulates in the upper space of the chamber. Hydrogen gas generated in the cathode compartment of the electrolytic cell is channeled along with deionized water to the gas/liquid separator through the hydrogen outflow pipe and accumulates in the upper space of the separator. The oxygen gas accumulating in the upper space of the oxygen gas separating chamber is channeled to the first gas piping line and delivered outward therefrom. The hydrogen gas accumulating in the upper space of the gas/liquid separator is channeled to the second gas piping line and delivered outward therefrom.

The pressure of oxygen gas in the oxygen gas separating chamber is detected by the first pressure detecting means whereas the pressure of hydrogen gas in the gas/liquid separator is detected by the second pressure detecting means. In accordance with the detected pressure values, the pressures of oxygen and hydrogen gases in the oxygen gas separating chamber and the gas/liquid separator, respectively, are controlled by the gas pressure control means. More specifically, the gas pressure control means functions such that the difference (differential pressure) between the pressure of oxygen gas in the oxygen gas separating chamber and the pressure of hydrogen gas in the gas/liquid separator may fall within a predetermined range. As a result, the differential pressure applied across the diaphragm in the form of a solid polymer electrolyte membrane separating the anode and cathode compartments of the cell falls within a predetermined range, preventing a failure of the diaphragm by an excessive differential pressure. The differential pressure applied across seals of the cell is also reduced, preventing gas leakage through the seals. Consequently, the system can increase the pressure of gas generated to a desired high level without inviting the risk of a failure of the diaphragm or gas leakage through the seals due to a differential pressure. That is, hydrogen and oxygen gases of high pressures can be delivered without a need for gas compressors. Since the increased pressure of a gas generated allows the partial pressure of moisture in that gas to be relatively reduced, hydrogen and oxygen gases of higher purity can be delivered.

In one preferred embodiment, the system further includes a first level detector means for detecting the level of water in the oxygen gas separating chamber and means for actuating the deionized water feed means to feed deionized water into the container in accordance with the water level in the oxygen gas separating chamber detected by the first level detector means. Then the water level in the oxygen gas separating chamber is detected, and deionized water is made up into the container in accordance with the detected position of the water level. This allows the water level in the oxygen gas separating chamber to be maintained substantially constant.

In another preferred embodiment, the system further includes a second level detector means for detecting the level of water in the gas/liquid separator and means for discharging water accumulated in the gas/liquid separator in accordance with the water level in the gas/liquid separator detected by the second level detector means. Then the water level below hydrogen gas in the gas/liquid separator is detected, and water in the gas/liquid separator is discharged in accordance with the detected position of the water level. This allows the water level in the gas/liquid separator to be maintained substantially constant.

In a further preferred embodiment, the system further includes a second level detector means for detecting the level of water in the gas/liquid separator, a discharge conduit connected between the gas/liquid separator and the container for discharging water accumulated in the gas/liquid separator therethrough, a pump disposed in the discharge conduit for pumping water from the gas/liquid separator to the container, and means for actuating the pump in accordance with the water level in the gas/liquid separator detected by the second level detector means. Then the water carried into the gas/liquid separator from the cell along with hydrogen gas is returned to the container. The amount of deionized water to be newly replenished to the container is only the amount of water consumed by electrolysis.

In a still further preferred embodiment, the system further includes a second level detector means for detecting the level of water in the gas/liquid separator, a discharge conduit connected between the gas/liquid separator and the container for discharging water accumulated in the gas/liquid separator therethrough, a valve disposed in the discharge conduit, and means for opening and closing the valve in accordance with the water level in the gas/liquid separator detected by the second level detector means, the gas pressure control means functioning such that the pressure of hydrogen gas accumulating in an upper space of the gas/liquid separator may be higher than the pressure of oxygen gas accumulating in an upper space of the oxygen gas separating chamber. Since the system is controlled such that the pressure of hydrogen gas in the gas/liquid separator may be higher than the pressure of oxygen gas in the oxygen gas separating chamber, water in the gas/liquid separator can be returned to the container without a need for mechanical transfer means such as a pump.

In a still further preferred embodiment, the gas pressure control means functions such that the difference between the pressure of oxygen gas accumulating in an upper space of the oxygen gas separating chamber and the pressure of hydrogen gas accumulating in an upper space of the gas/liquid separator may fall within a predetermined range. Since the difference between the pressure of oxygen gas in the oxygen gas separating chamber and the pressure of hydrogen gas in the gas/liquid separator is controlled to fall within the predetermined range, the differential pressure applied across the diaphragm of the cell is minimized. As a consequence, the pressure of gas generated can be increased.

In a second form, the present invention provides a hydrogen and oxygen gas generating system comprising a water electrolysis cell having anode and cathode compartments separated from one another by a diaphragm wherein deionized water is electrolyzed to generate oxygen and hydrogen gases in the anode and cathode compartments, respectively, an oxygen outflow pipe connected to the anode compartment of the electrolytic cell for channeling oxygen gas resulting from electrolysis upward from the anode compartment, a hydrogen outflow pipe connected to the cathode compartment of the electrolytic cell for channeling hydrogen gas resulting from electrolysis upward from the cathode compartment, a container filled with deionized water, surrounding the electrolytic cell and supporting the cell submerged in deionized water, the container including a partition for dividing an upper portion of the container into oxygen and hydrogen compartments in a fluid tight manner to prevent any gas leakage therebetween, upper ends of the oxygen and hydrogen outflow pipes opening in the oxygen and hydrogen compartments, respectively, a deionized water feed means for feeding deionized water into the container, the cell further having a communication port at the bottom of the anode compartment for communication of deionized water between the cell interior and the container interior, a first level detector means for detecting the level of water in the oxygen compartment, a second level detector means for detecting the level of water in the hydrogen compartment, a first gas piping line for delivering outward the oxygen gas accumulating in an upper space of the oxygen compartment, the first gas piping line having one flow controller for controlling the flow rate of outward oxygen gas flow and the first gas piping line including a branch for leaking oxygen gas and another flow controller in the branch for controlling the flow rate of leaking oxygen gas flow, a second gas piping line for delivering outward the hydrogen gas accumulating in an upper space of the hydrogen compartment, the second gas piping line having a flow meter for measuring the flow rate of hydrogen gas, a gas flow rate control means for controlling at least one of the flow controllers of the first gas piping line in accordance with a measurement of the flow meter of the second gas piping line and controlling the other flow controller in the branch of the first gas piping line in accordance with the water level detected by the second or first level detector means, the deionized water feed means being actuated to feed deionized water into the container in accordance with the water level detected by the first or second level detector means, a DC power source for supplying electric power to the electrolytic cell, and a power regulator coupled to the DC power source for controlling the power supply to the electrolytic cell in accordance with the pressure detected by a gas pressure detecting means in the second or first gas piping line so that the gas pressure may reach a predetermined pressure value.

In the system of the second form, the oxygen and hydrogen gases generated in the anode and cathode compartments of the cell are independently channeled to the oxygen and hydrogen compartments in the upper portion of the container, respectively. Since the oxygen and hydrogen compartments are separated by the partition, no intermixing of oxygen and hydrogen gases occurs. The oxygen and hydrogen gases accumulated in the oxygen and hydrogen compartments of the container are channeled to the first and second gas piping lines, respectively, and then delivered outward.

The flow rate of hydrogen gas through the second gas piping line is detected. In accordance with this detected flow rate, the sum of the flow rate of oxygen gas through the outward delivery section of the first gas piping line and the flow rate of oxygen gas through the leaking branch of the first gas piping line is controlled. More specifically, control is made such that the total flow rate of oxygen gas through the first gas piping line may be one half of the flow rate of hydrogen gas through the second gas piping line. Then the gas pressures in the oxygen and hydrogen compartments are maintained substantially equal. Furthermore, either one or both of the flow controllers in the first gas piping line are controlled in accordance with the water level detected by the second or first level detector means (that is, the water level in the hydrogen or oxygen compartment) whereby the water level in the hydrogen or oxygen compartment is maintained at the predetermined position, which in turn, ensures to maintain the hydrogen gas flow rate and the oxygen gas flow rate correctly at a ratio of 2/1. Then as in the first form, the differential pressure applied across the diaphragm between the anode and cathode compartments of the cell is minimized. As a consequence, gases under high pressures can be delivered. It is understood that the gas pressure can also be controlled in terms of the power supplied to the cell.

In a preferred embodiment, the gas flow rate control means controls such that the total flow rate of oxygen gas through the one and other flow controllers of the first gas piping line may be one half of the flow rate of hydrogen gas through the second gas piping line. Since the total flow rate of oxygen gas through the first gas piping line is ½ of the flow rate of hydrogen gas through the second gas piping line, the gas pressures in the oxygen and hydrogen compartments are maintained substantially equal. The differential pressure applied across the diaphragm between the anode and cathode compartments of the cell is then minimized.

The following preferred embodiments apply to both the first and second forms of the invention.

In a still further preferred embodiment, the system further includes a loop connected to the container and having a pump, a heat exchanger, an ion exchanger, and a filter arranged in series for circulating deionized water between the container and the loop. The deionized water in the container is continuously cooled and purified by circulating the deionized water through the loop. This prevents the deionized water from raising its temperature and from being contaminated with materials dissolved out from the container and the cell. As a result, gases of higher purity can be generated.

In a still further preferred embodiment, the system further includes a deionized water supply line connected to an outlet port of the container and the communication port of the electrolytic cell and having a pump, a heat exchanger, an ion exchanger, and a filter arranged in series for supplying deionized water from the container to the cell through the supply line. While deionized water is supplied from the container to the cell, it is purified and cooled. This prevents the deionized water from temperature rise and contamination, enabling to generate gases of higher purity.

In a still further preferred embodiment, the system further includes a cooling means embracing the container for cooling the container with coolant, typically cooling water or cooling air. Cooling the container from the outside can prohibit any abnormal temperature rise even when large amounts of gases are generated.

In a still further preferred embodiment, each of the first and second gas piping lines includes a pressure retaining means which opens to allow gas flow when the applied pressure is not lower than a preset value and closes to prevent gas flow when the applied pressure is lower than the preset value. The pressure retaining means in the first and second gas piping lines prevent outward delivery of oxygen and hydrogen gas insofar as the pressure of oxygen gas in the upper space of the oxygen gas separating chamber (or oxygen compartment) and the pressure of hydrogen gas in the upper space of the gas/liquid separator (or hydrogen compartment) do not exceed the predetermined pressure values. This prevents the gas pressures from losing balance even in a situation where gases might be consumed in amounts in excess of the amounts of gases generated. Stable and safe gas delivery is possible. Oxygen and hydrogen gases under desired high pressures can be delivered to the sites of consumption.

In a still further preferred embodiment, the container is loaded with an ion exchange resin. The deionized water in the container is continuously purified by the ion exchange resin, permitting the gases of higher purity to be generated.

In a still further preferred embodiment, at least one of the first and second gas piping lines includes a gas dryer. Since moisture in the oxygen and/or hydrogen gas is removed by the gas dryer, the gas of higher purity can be delivered.

In a still further preferred embodiment, the diaphragm is a membrane of a solid polymer electrolyte.

In a still further preferred embodiment, the container is made of stainless steel and has a passivated oxide film formed on the inner surface thereof. The stainless steel with a passivated oxide lining minimizes dissolution of components of the container into deionized water, preventing contamination of deionized water and allowing gases of higher purity to be generated.

BRIEF DESCRIPTION OF THE DRAWINGS

These and further features of the present invention will be apparent with reference to the following description and drawings, wherein.

DESCRIPTION OF THE PREFERRED EMBODIMENTS

Figure 1:
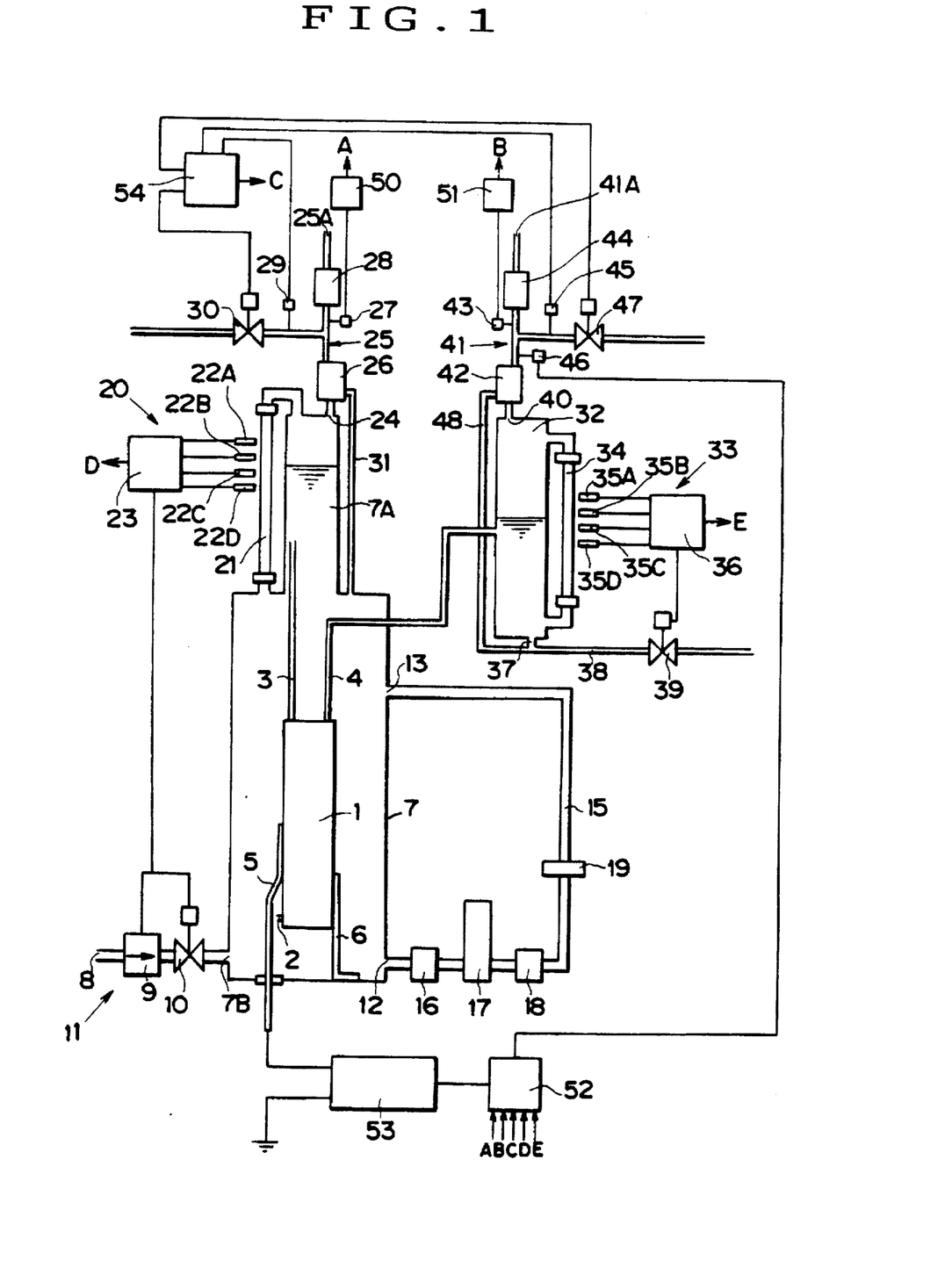
FIG. 1 is a block diagram showing a hydrogen and oxygen generating system according to a first embodiment of the invention.

Referring to FIG. 1, there is illustrated a hydrogen and oxygen gas generating system according to a first embodiment of the present invention.

The system includes a water electrolysis cell 1 and a deionized water container 7 accommodating the cell 1 therein. The cell 1 is to effect electrolysis of pure or deionized water into hydrogen and oxygen gases. The cell 1 includes an anode compartment, a cathode compartment and a diaphragm in the form of a solid polymer electrolyte membrane separating the compartments from each other although the interior of the cell 1 is not shown. The cell 1 at the bottom is provided with a communication port 2 for allowing deionized water to enter the anode compartment from the outside. At the top of the cell 1, specifically at the top of the anode compartment is connected an oxygen outflow pipe 3 for channeling oxygen gas generated by electrolysis of deionized water in the anode compartment upward and releasing it into an oxygen gas separating chamber 7A of the container 7 to be described later. Also at the top of the cell 1, specifically at the top of the cathode compartment is connected a hydrogen outflow pipe 4 for channeling hydrogen gas generated by electrolysis of deionized water in the cathode compartment to guide it outside the container 7. An anodic electricity feeder plate 5 is in contact with the outer surface of the cell 1 on its anode compartment side and a cathodic electricity feeder plate 6 is in contact with the outer surface of the cell 1 on its cathode compartment side. The feeder plate 6 also serves as a support for supporting the water electrolysis cell 1 in the container 7. A DC power source 53 is electrically connected to the cell 1 for supplying an electric power between the anodic feeder plate 5 and the cathodic feeder plate/support 6 for effecting electrolysis of deionized water. A power regulator 52 is electrically coupled with the DC power source 53 for controlling its power supply.

The water electrolysis cell 1 as a whole is accommodated in the container 7 which is filled with deionized water, so that the cell 1 is immersed in deionized water. The container 7 is configured and sized such that the cell 1 supported upright by the cathodic feeder plate/support 7 is received inside the container 7 and deionized water surrounds the outside of the cell 1. The container 7 includes an upper portion which is disposed above the cell 1 and defines an oxygen gas separating chamber 7A. The distal end of the oxygen outflow pipe 3 opens in the oxygen gas separating chamber 7A. The hydrogen outflow pipe 4 is extended outside the container 7 and connected to a gas/liquid separator 32 to be described later.

The deionized water container 7 is provided at the bottom with a water intake port 7B. An external water feed conduit 8 is connected to the intake port 7B through a feed pump 9 and a control valve 10 for pumping and controlling deionized water flow therethrough. The feed conduit 8, feed pump 9 and control valve 10 form a deionized water feed means 11 for feeding deionized water into the container 7 in a controlled manner in response to a signal from a first water level detector means 20 to be described later. A deionized water outlet 12 is located at the bottom of the container 7, but at a position opposite to the intake port 7B. A deionized water inlet 13 is located in a middle portion of the container 7. The outlet 12 and inlet 13 are connected by a loop conduit 15 which extends outside the container 7. Midway of the loop conduit 15, a water feed pump 16, an ion exchange resin column 17, a chiller 18 as a heat exchanger, and a filter 19 are located in the described order from the outlet 12.

At the top of the deionized water container 7 is disposed a first water level detector means 20 for detecting the level of deionized water in the oxygen gas separating chamber 7A, that is, the surface of deionized water below oxygen gas accumulating in the chamber. This first water level detector means 20 includes a level gauge 21, level sensors 22A to 22D for sensing the position of water surface within the level gauge 21, and a level detecting and controlling device 23 electrically connected to the level sensors 22A to 22D. The level detecting and controlling device 23 is coupled to the deionized water feed means 11 for controlling the feed pump 9 and control valve 10 thereof. The level detecting and controlling device 23 also delivers an alarm signal D to the power regulator 52.

The deionized water container 7 at its top, specifically at the top of the oxygen gas separating chamber 7A is provided with an oxygen gas outlet 24. A first gas piping line 25 is connected to the outlet 24 for taking out oxygen gas accumulating in an upper space of the oxygen gas separating chamber 7A. This first gas line 25 includes a gas dryer 26, a combustible gas sensor 27, and a pressure retaining valve 28. The first gas line 25 further includes a first gas pressure detecting means in the form of a first gas pressure sensor 29 for detecting the pressure of oxygen gas accumulating in the upper space of the oxygen gas separating chamber 7A and a leak valve 30. The first gas line 25 has a downstream end which forms an oxygen gas delivery port 25A for delivering oxygen gas to a site where oxygen gas is consumed (not shown). The gas dryer 26 has a drain pipe 31 connected thereto for returning removed water to the container 7.

The hydrogen outflow pipe 4 extending from the water electrolysis cell 1 is connected to a gas/liquid separator 32 disposed outside the container 7. The gas/liquid separator 32 functions to separate hydrogen gas generated in the cathode compartment of the cell 1 from water. The gas/liquid separator 32 is provided with a second water level detector means 33 for detecting the level of water in the separator 32, that is, the surface of water below hydrogen gas accumulating in the separator. This second water level detector means 33 includes a level gauge 34, level sensors 35A to 35D for sensing the position of water surface within the level gauge 34, and a level detecting and controlling device 36 electrically connected to the level sensors 35A to 35D. The gas/liquid separator 32 is provided at the bottom with a discharge port 37 to which is connected a discharge conduit 38 having a release valve 39. The level detecting and controlling device 36 is coupled to the release valve 39 for controlling the valve 39 for discharging water through the conduit 38. The level detecting and controlling device 36 also delivers an alarm signal E to the power regulator 52.

The gas/liquid separator 32 at its top is provided with a hydrogen gas outlet 40. A second gas piping line 41 is connected to the outlet 40 for taking out hydrogen gas accumulating in an upper space of the gas/liquid separator 32. This second gas line 41 includes a gas dryer 42, a combustible gas sensor 43, and a pressure retaining valve 44. The second gas line 41 further includes a second gas pressure detecting means in the form of a second gas pressure sensor 45 for detecting the pressure of hydrogen gas accumulating in the upper space of the gas/liquid separator 32, a third gas pressure sensor 46, and a leak valve 47. The second gas line 41 has a downstream end which forms a hydrogen gas delivery port 41A for delivering hydrogen gas to a site where hydrogen gas is consumed (not shown). The gas dryer 42 has a drain pipe 48 connected thereto for flowing removed water to the discharge conduit 38.

The combustible gas sensors 27 and 43 included in the first and second gas lines 25 and 41 are connected to combustible gas detectors 50 and 51, respectively. The combustible gas detectors 50 and 51 deliver alarm signals A and B to the power regulator 52. The first and second gas pressure sensors 29 and 45 of the first and second gas lines 25 and 41 have outputs connected to a gas pressure controller 54. The gas pressure controller 54 functions to control the leak valves 30 and 47 of the first and second gas lines 25 and 41 and delivers an alarm signal C to the power regulator 52. The power regulator 52 is thus electrically connected so as to receive alarm signals from the gas pressure controller 54, combustible gas detectors 50, 51, and water level detecting/controlling device 23, 36 and to control the power applied from the DC source 53 to the electrolytic cell 1 in response to the signals.

Further referring to FIG. 1, the operation of the system according to the first embodiment is described.

At the initial state, the interior of the container 7 including the interior (anode and cathode compartments) of the electrolytic cell 1 is filled with deionized water. In this state, a DC voltage is applied between the anodic feeder plate 5 and the cathodic feeder plate/support 6 by the DC power source 53 whereby electrolysis of deionized water takes place in the cell 1 to generate $O^{2-}$ and $H^+$ ions. $O^{2-}$ ions generated in the anode compartment are immediately converted into oxygen gas at the anode surface. The oxygen gas in a mixed state with deionized water moves upward through the oxygen outflow pipe 3 and enters the oxygen gas separating chamber 7A. In accordance with the upward flow of oxygen gas, deionized water flows into the electrolytic cell 1 through the communication port 2 so that deionized water necessary for electrolysis is replenished and at the same time, natural convection of deionized water occurs in the anode compartment, by which the electrolytic cell 1 is cooled. $H^+$ ions generated in the anode compartment simultaneous with the generation of $O^{2-}$ ions migrate into the cathode compartment through the solid polymer electrolyte membrane under the impetus of the electric field between the anode and the cathode. In the cathode compartment, the $H^+$ ions lose electric charges and form hydrogen gas. The hydrogen gas in a mixed state with entrained water is channeled through the hydrogen outflow pipe 4 to the gas/liquid separator 32 where the mixture is separated into deionized water and hydrogen gas.

The oxygen gas, which is channeled together with deionized water into the oxygen gas separating chamber 7A through the oxygen outflow pipe 3, is separated from deionized water in the separating chamber 7A and collects in the upper space of the separating chamber 7A. While the pressure of oxygen gas in the upper space of the oxygen separating chamber 7A is lower than the preset pressure of the pressure retaining valve 28 in the first gas line 25, the pressure retaining valve 28 is kept closed so that no oxygen gas is released from the oxygen gas delivery port 25A. Accordingly, the oxygen gas accumulating in the upper space of the oxygen separating chamber 7A increases its pressure with the progress of electrolysis in the electrolytic cell 1. On the other hand, the hydrogen gas, which is channeled together with deionized water into the gas/liquid separator 32, is separated from deionized water in the separator 32 and collects in the upper space thereof. While the pressure of hydrogen gas in the upper space of the separator 32 is lower than the preset pressure of the pressure retaining valve 44 in the second gas line 41, the pressure retaining valve 44 is kept closed so that no hydrogen gas is released from the hydrogen gas delivery port 41A. Accordingly, the hydrogen gas accumulating in the upper space of the separator 32 also increases its pressure with the progress of electrolysis in the electrolytic cell 1.

The pressure retaining valve 28 in the first gas line 25 and the pressure retaining valve 44 in the second gas line 41 have preset pressures of the same value. The pressure of oxygen gas confined in the upper space of the oxygen gas separating chamber 7A due to the pressure retaining valve 28 kept closed is detected by the first gas pressure sensor 29 whereas the pressure of hydrogen gas confined in the upper space of the gas/liquid separator 32 due to the pressure retaining valve 44 kept closed is detected by the second gas pressure sensor 45. Detection signals of the gas pressure sensors 29 and 45 are transmitted to the gas pressure controller 54 which controls the leak valves 30 and 47 such that either one of the gases at a higher pressure is leaked through the corresponding one of the leak valves 30 and 47 when the differential pressure between oxygen and hydrogen gases exceeds 0.5 kg/cm², for example. This leakage is continued until the pressures of both the gases become equal. Accordingly, the oxygen gas accumulating in the upper space of the oxygen gas separating chamber 7A and the hydrogen gas accumulating in the upper space of the gas/liquid separator 32 are always controlled to have pressures which are approximately equal to each other in that the differential pressure does not exceed 0.5 kg/cm². As a consequence, the water electrolysis cell 1 is controlled such that a differential pressure in excess of 0.5 kg/cm² may not be applied across the solid polymer electrolyte membrane separating the anode and cathode compartments in the cell. If the differential pressure exceeds 1 kg/cm², for example, for some reason or other, the pressure controller 54 delivers an alarm signal C to the power regulator 52 which controls the output of the DC power source 53 to be zero, thereby urgently shutting down electrolysis in the cell 1 to prevent further differential pressure from being applied across the electrolyte membrane. Since solid polymer electrolyte membranes generally have a pressure resistance of about 3 to 5 kg/cm², the preferred embodiment wherein the differential pressure is controlled to be below 0.5 kg/cm² in normal state and below 1 kg/cm² even in the event of emergency as mentioned above ensures to protect the membrane from failure by a differential pressure. Seals associated with the water electrolysis cell 1 generally have a pressure resistance of about 3 to 5 kg/cm². Since the deionized water in both the anode and cathode compartments of the electrolytic cell 1 is continuous to the deionized water outside the cell 1 so that the deionized waters in both the regions have an identical pressure, the above-mentioned gas differential pressure control ensures to prevent any leakage of gases and water from the cell 1 through the seals.

With the progress of electrolysis, the oxygen and hydrogen gases gradually increase their pressures. When these pressures of the oxygen and hydrogen gases exceed the preset pressures of the pressure retaining valves 28 and 44, the pressure retaining valves 28 and 44 open, allowing the oxygen and hydrogen gases from exiting the oxygen and hydrogen gas delivery ports 25A and 41A for delivery to consumption sites in a semiconductor manufacturing plant or the like.

It is noted that the power regulator 52 receives a detection signal of the third gas pressure sensor 46 which detects the pressure of hydrogen gas in the upper space of the gas/liquid separator 32 and controls the output of the DC power source 53 such that the pressure of hydrogen gas may be higher than the preset pressure of the pressure retaining valve 44 (which is equal to the preset pressure of the pressure retaining valve 28) by a predetermined value, for example, equal to the preset pressure of the pressure retaining valve 44 plus 1 kg/cm². Therefore, on delivery of oxygen and hydrogen gases, their gas pressures are always maintained constant.

In the above-mentioned process, deionized water in the container 7 is gradually consumed as deionized water is electrolyzed into hydrogen and oxygen gases in the cell 1. Then the level of water in the container 7, more specifically the level of water in the oxygen gas separating chamber 7A gradually lowers. This water level is detected by the first water level detector means 20. In accordance with the detected water level, the level detecting and controlling device 23 controls the feed pump 9 and control valve 10 of the deionized water feed means 11 to make up deionized water into the container 7 so that the water level in the container 7 is always maintained approximately constant. It is to be noted that if the highest level sensor 22A or lowest level sensor 22D detects the water level in the event of an accident, the level detecting and controlling device 23 delivers an alarm signal D to the power regulator 52 which controls the output of the DC power source 53 to be zero, accomplishing emergency shut-down of electrolysis in the cell 1.

Upon electrolysis, the deionized water in the container 7 tends to gradually increase its temperature since it is heated due to the power supplied for electrolysis and to gradually lower its purity since the material of the container 7 is gradually dissolved out from the inner wall. In the illustrated embodiment, deionized water in the container 7 is continuously circulated through the loop conduit 15 by the feed pump 16 where it passes the ion exchange resin column 17, chiller 18, and filter 19 whereby the deionized water is continuously cooled and purified. This prevents the deionized water in the container 7 from being excessively heated or boiling. Also the resistivity of deionized water is maintained as high as 16 megaohm or more, preventing short-circuiting between the anodic electricity feeder plate 5 and the cathodic electricity feeder plate/support 6.

In the gas/liquid separator 32, the deionized water which has been carried from the anode compartment to the cathode compartment along with migration of H⁺ ions is further carried away from the cell 1 to the separator 32 along with hydrogen gas. The deionized water accumulates in the separator 32. The level of this water is detected by the second water level detector means 33. In accordance with the detected water level, the level detecting and controlling device 36 controls the release valve 39 so that the water level in the separator 32 is always maintained approximately constant. It is to be noted that if the highest level sensor 35A or lowest level sensor 35D detects the water level in the event of an accident, the level detecting and controlling device 36 delivers an alarm signal D to the power regulator 52 which controls the output of the DC power source 53 to be zero, accomplishing emergency shut-down of electrolysis in the cell 1.

The oxygen and hydrogen gases accumulating in the upper spaces of the oxygen gas separating chamber 7A and gas/liquid separator 32, respectively, contain saturated steam. Since the first and second gas piping lines 25 and 41 are provided with gas dryers 26 and 42, respectively, for removing steam, the oxygen and hydrogen gases outflowing from the lines 25 and 41 are dry. The gas dryers 26 and 42 used herein are of the type wherein the incoming gas is cooled by an electronic thermo-element to condense moisture for removal. Water condensates removed from the gases by the dryers 26 and 42 are channeled to the container 7 and discharge conduit 38 through drain pipes 31 and 48, respectively. The gas dryers 26 and 42 are not limited to the illustrated example and molecular sieves may be used, for example.

It is understood that the pressures of moisture (or saturated steam pressures) contained in oxygen and hydrogen gases accumulating in the upper spaces of the oxygen gas separating chamber 7A and gas/liquid separator 32 depend on the temperatures of deionized water in the oxygen gas separating chamber 7A and gas/liquid separator 32. As the gas pressures of oxygen and hydrogen gases in these regions increase, the proportion of the pressure of steam, that is, steam partial pressure is accordingly reduced. Since the saturated steam pressure at 20° C. is about 0.023 atm., hydrogen gas containing saturated steam under atmospheric pressure contains about 2.3% of moisture. However, even if the pressure of hydrogen gas is increased to, for example, 100 atm., the saturated steam pressure remains unchanged as long as the temperature is constant. Then the partial pressure of steam is reduced to 1/100 of that under atmospheric pressure, that is, the moisture content in hydrogen gas can be reduced to 1/100 of that under atmospheric pressure. This is also true for oxygen gas. Therefore, it is possible to further reduce the moisture content in the gas not only by providing the gas dryers 26 and 42 as mentioned above, but also by establishing as high a pressure as possible relative to the pressure on intended use. The high pressure gas may be reduced in pressure on the gas usage side. The system of the present invention enables that the gas pressure be increased in practice.

More particularly, as mentioned above, the pressure of the oxygen gas accumulating in the upper space of the oxygen gas separating chamber 7A and the pressure of the hydrogen gas accumulating in the upper space of the gas/liquid separator 32 can be controlled so that the differential pressure therebetween may be less than 0.5 kg/cm$^2$, for example, independent of their magnitude, and therefore, the differential pressure acting across the solid polymer electrolyte membrane separating the anode and cathode compartments of the water electrolysis cell 1 can also be always maintained below 0.5 kg/cm$^2$. Then even if the pressures of the oxygen and hydrogen gases accumulating in the upper spaces of the oxygen gas separating chamber 7A and gas/liquid separator 32 are increased in magnitude, it is possible to avoid failure of the solid polymer electrolyte membrane by the differential pressure in the cell 1 and to prevent any leakage of hydrogen gas from the cell 1 through the seals.

In the event of an accident wherein hydrogen gas leaks into the container 7, the combustible gas detectors 50 and 51 coupled with the combustible gas sensors 27 and 43 detect such leakage before the explosion limit is reached and deliver alarm signals A and B to the power regulator 52 which controls the output of the DC power source 53 to be zero, accomplishing emergency shut-down of electrolysis in the cell 1. Further leakage of hydrogen gas is thus prevented, avoiding explosion.

The system of the first embodiment enables to increase the pressures of the oxygen and hydrogen gases to be delivered to the outside for thereby reducing the moisture content in the oxygen and hydrogen gases. Oxygen and hydrogen gases of desirably high pressure can be generated without a need for gas compressors. Then clean oxygen and hydrogen gases can be delivered without contamination with lubricant oil which would often occur when gas compressors are used.

It is noted that the third gas pressure sensor 46 is provided separately from the second gas pressure sensor 45 in the illustrated embodiment. Since they are both to detect the pressure of hydrogen gas accumulating in the upper space of the gas/liquid separator 32, these sensors may be combined into a single gas pressure sensor which delivers a detection signal to both the gas pressure controller 54 and the power regulator 52.

In the illustrated embodiment, deionized water in the container 7 is cooled and purified by means of the ion exchange resin column 17, chiller 18, and filter 19 in the loop conduit 15. In order to more positively prevent the deionized water from being contaminated by dissolving out of the material of the container 7 from its wall, the container 7 and gas/liquid separator 32 are formed of stainless steel with a passivated coating formed on at least the inner surface. It is well known that such a measure can minimize dissolving out of the container material into deionized water. Plastic materials such as PEEK may also be used to form the container 7 and gas/liquid separator 32 since they are least dissolved into deionized water.

Figure 2:
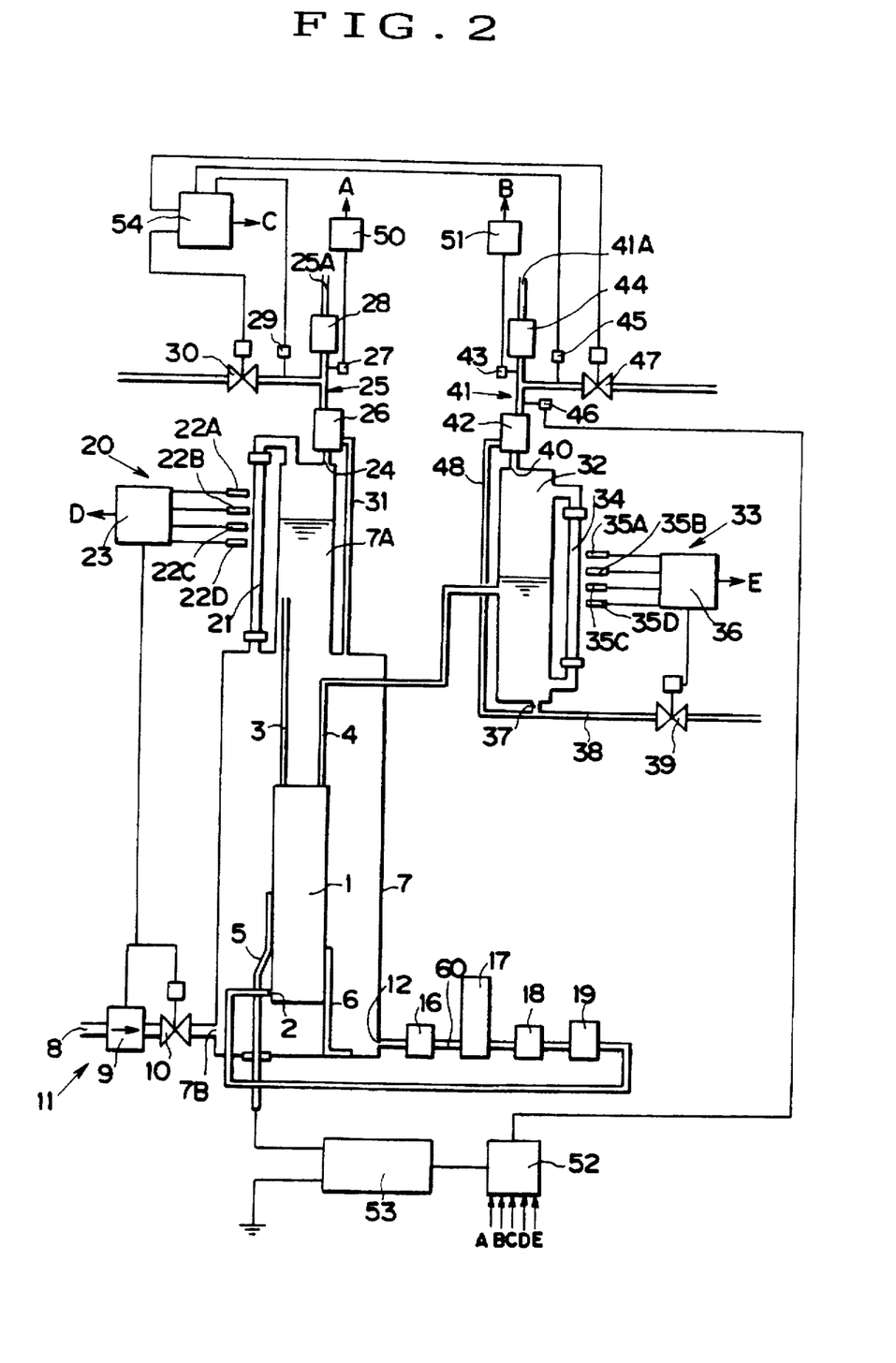
FIG. 2 is a block diagram showing a hydrogen and oxygen generating system according to a second embodiment of the invention.

FIG. 2 shows a hydrogen/oxygen gas generating system according to a second embodiment of the present invention. The same elements as in the first embodiment shown in FIG. 1 are designated by like numerals and their description is omitted.

The second embodiment of FIG. 2 is different from the first embodiment of FIG. 1 in that instead of the loop circuit 15 shown in FIG. 1, a deionized water supply line 60 is extended from the outlet 12 at the bottom of the container 7 to the communication port 2 of the electrolytic cell 1. A water feed pump 16, an ion exchange resin column 17, a chiller 18 as a heat exchanger, and a filter 19 are located in the circulation line 60.

In this embodiment, deionized water is pumped from the container 7 into the electrolytic cell 1 through the pump 16, ion exchange column 17, chiller 18, and filter 19. Therefore deionized water which has been cooled and purified is pumped at a constant flow rate into the cell 1 by the pump 16.

Figure 3:
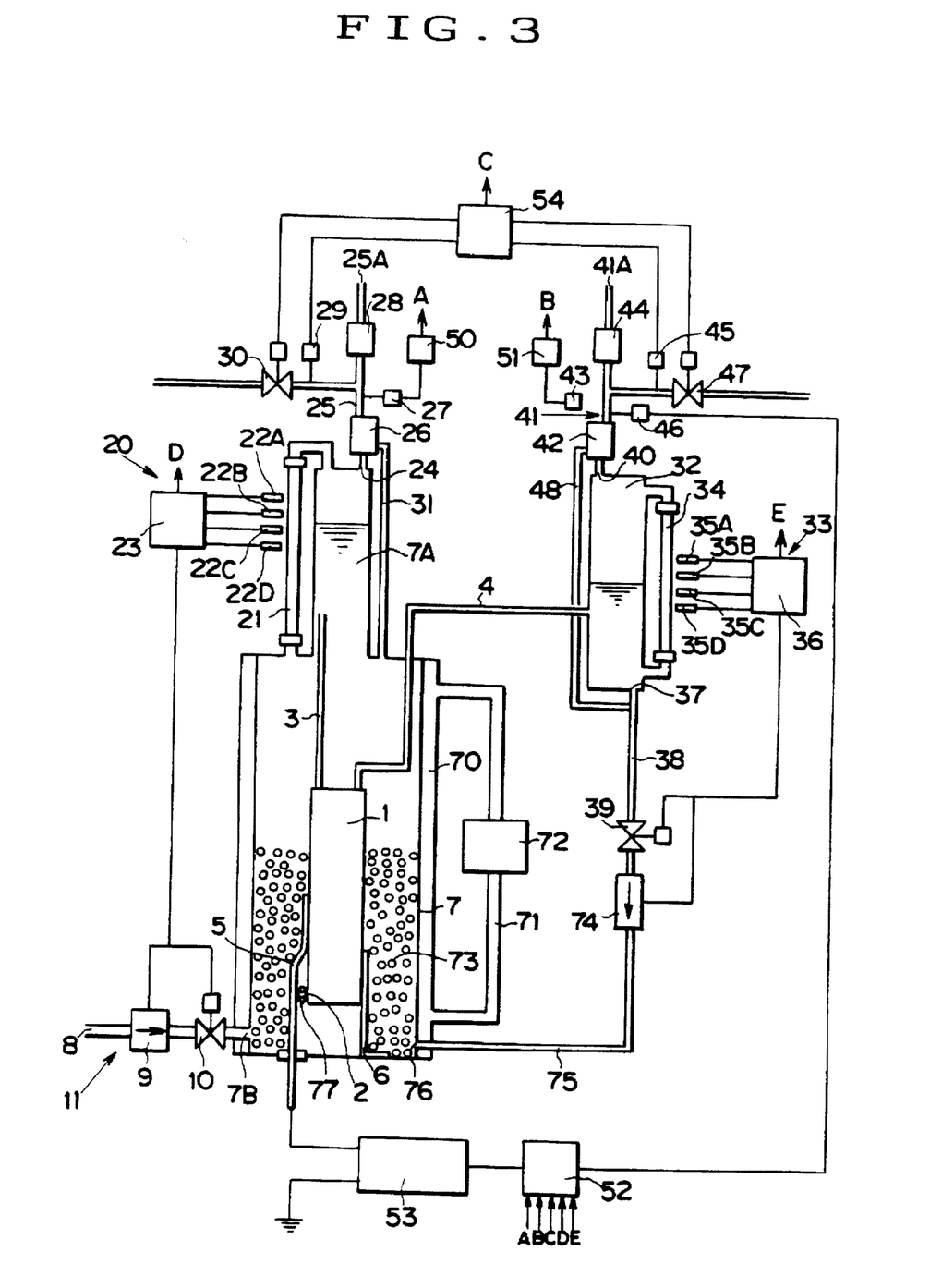
FIG. 3 is a block diagram showing a hydrogen and oxygen generating system according to a third embodiment of the invention.

FIG. 3 shows a hydrogen/oxygen gas generating system according to a third embodiment of the present invention. The same elements as in the first embodiment shown in FIG. 1 are designated by like numerals and their description is omitted.

In the embodiment of FIG. 3, the wall of the container 7 is a hollow double wall structure which forms a water cooling jacket 70. A cooling water circulation line 71 is connected to the jacket 70 near its top and bottom and has a chiller 72 located midway thereof. An ion exchange resin 73 is received inside the container 7 and outside the electrolytic cell 1. A filter 77 is attached to the communication port 2 of the cell 1. The discharge conduit 38 connected to the discharge port 37 at the bottom of the gas/liquid separator 32 is connected to an input side of a water feed pump 74 through the release valve 39. The water pump 74 has an output side connected to a return port 76 located at the bottom of the container 7 through a return conduit 75. It is noted that the release valve 39 and feed pump 74 are controlled by the water level detecting and controlling device 36 of the second water level detector means 33. The remaining arrangement is the same as in the first embodiment shown in FIG. 1.

In the third embodiment shown in FIG. 3, after deionized water is carried along with hydrogen gas from the electrolytic cell 1 to the gas/liquid separator 32 and accumulates in the gas/liquid separator 32, it is returned to the container 7 by the pump 74 through the discharge conduit 38, valve 39 and return conduit 75. More particularly, the water level in the gas/liquid separator 32 is detected by the second water level detector means 33. If the water level rises, the water level detecting and controlling device 36 controls the release valve 39 and feed pump 74 for returning deionized water from the gas/liquid separator 32 to the container 7. As a result, the water level in the gas/liquid separator 32 is maintained approximately constant. Since the deionized water which is once carried away from the electrolytic cell 1 to the gas/liquid separator 32 is returned to the container 7 in this way, the amount of deionized water newly made up by the feed pump 9 through the control valve 10 is only the amount of water consumed by electrolysis. That is, it is sufficient to make up substantially 1 liter of deionized water per 1 cubic meters of hydrogen gas and 0.5 cubic meters of oxygen gas evolved.

As in the first embodiment of FIG. 1, since the hydrogen gas in the upper space of the gas/liquid separator 32 and the oxygen gas in the upper space of the oxygen gas separating chamber 7A are controlled to substantially equal pressures with the differential pressure falling within 0.5 kg/cm², only a minimized amount of hydrogen gas which is dissolved in the water returned from the gas/liquid separator 32 to the container 7 is released in the container 7 to mix with oxygen gas in the oxygen gas separating chamber 7A, eliminating the risk of producing detonating gas. Even if hydrogen gas in the water returned to the container 7 is released in the container 7 and hence, in the oxygen gas separating chamber 7A, it is discharged outside along with oxygen gas through oxygen gas delivery port 25A or leak valve 30, eliminating the risk that hydrogen gas accumulates in the container 7 to a sufficiently high concentration to form detonating gas.

Since the container 7 is loaded with the ion exchange resin 73 in the embodiment of FIG. 3, the deionized water in the container 7 is maintained in a continuously purified state. The filter 77 at the communication port 2 of the electrolytic cell 1 prevents the ion exchange resin 73 from entering the anode compartment of the cell.

The water cooling jacket 70 surrounds the wall of the container 7. Coolant water is circulated through the jacket 70 while being cooled by the chiller 72. Heat generated by electrolysis in the electrolytic cell 1 is removed by the coolant water flowing through the jacket 70, preventing the cell 1 from reaching an abnormally high temperature. Where the system is designed to generate small amounts of gases, the amount of heat generated is also small. Then instead of water cooling, air cooling with a forced flow of cold air is sufficient and sometimes, natural heat dissipation is satisfactory.

It is noted that although the hydrogen gas in the gas/liquid separator 32 and the oxygen gas in the oxygen gas separating chamber 7A are controlled to substantially equal pressures in the illustrated embodiments, the control program of the gas pressure controller 54 may be altered so that the pressure of hydrogen gas in the gas/liquid separator 32 is always slightly higher than the pressure of oxygen gas in the oxygen gas separating chamber 7A (for example, by about 0.5 kg/mm²). This differential pressure can force the water accumulating in the gas/liquid separator 32 back into the container 7 through the discharge conduit 38 and return conduit 75. Then the feed pump 74 may be replaced by an openable valve and/or a check valve having no pumping action. Where an openable valve is used, it may be controlled in accordance with the water level in the gas/liquid separator 32 detected by the second water level detector means 33. As is evident from the foregoing description, the difference in pressure between the hydrogen gas in the gas/liquid separator 32 and the oxygen gas in the oxygen gas separating chamber 7A should be suppressed to less than about 1 kg/cm², for example, so that a significant differential pressure may not act across the electrolyte membrane in the electrolytic cell 1.

In the foregoing embodiments, separation of water from hydrogen gas generated in the electrolytic cell 1 is carried out in the gas/liquid separator 32 separate from the container 7. In some cases, the gas/liquid separator 32 may be omitted, and separation of water from hydrogen gas can also be carried out within the electrolytic cell 1. This is illustrated in FIG. 4 as a fourth embodiment.

Figure 4:
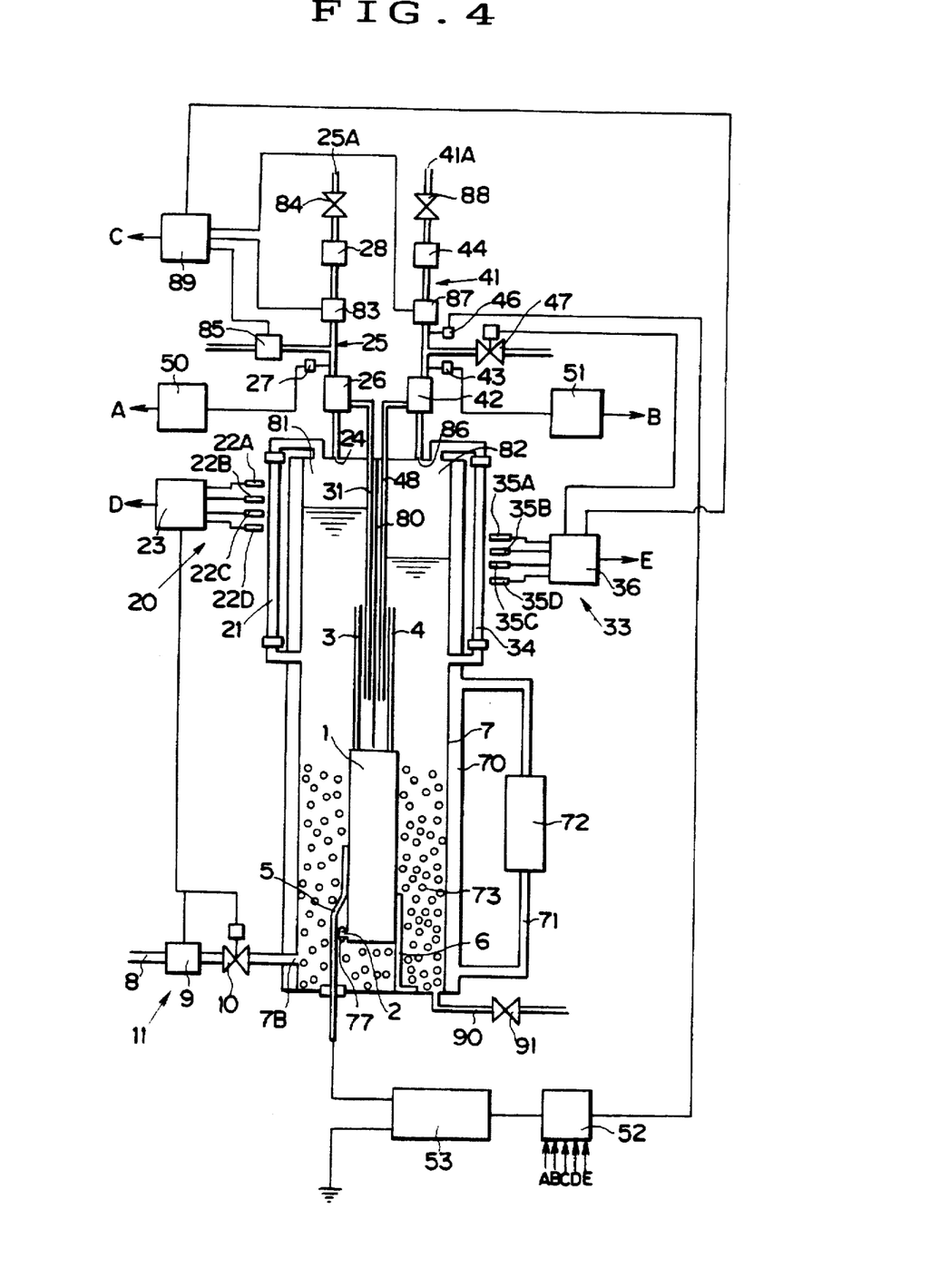
FIG. 4 is a block diagram showing a hydrogen and oxygen generating system according to a fourth embodiment of the invention.

In the embodiment of FIG. 4, the electrolytic cell 1 is accommodated in the container 7 as in the foregoing embodiments. Above the electrolytic cell 1, the interior of the container 7 is divided and partitioned by a central partition 80 into two compartments, an oxygen compartment 81 corresponding to the anode compartment of the cell 1 and a hydrogen compartment 82 corresponding to the cathode compartment of the cell 1. The oxygen outflow pipe 3 for channeling oxygen gas from the anode compartment of the cell 1 has a distal end which opens in the oxygen compartment 81. The hydrogen outflow pipe 4 for channeling hydrogen gas from the cathode compartment of the cell 1 has a distal end which opens in the hydrogen compartment 82.

Associated with the oxygen compartment 81 of the container 7 is the first water level detector means 20 including a level gauge 21 as in the foregoing embodiments. Similarly associated with the hydrogen compartment 82 of the container 7 is the second water level detector means 33 including a level gauge 34. The second water level detector means 33 is of the same arrangement as that associated with the gas/liquid separator 32 in the foregoing embodiments. The container 7 has a water cooling jacket which is the same as in the third embodiment of FIG. 3. A drain pipe 90 is connected to the container 7 at its bottom and has a manual drain valve 91 associated therewith.

The first gas piping line 25 is connected to the oxygen gas outlet 24 at the top of the oxygen compartment 81 of the container 7 and has a gas dryer 26, a combustible gas sensor 27, and a pressure retaining valve 28 as in the foregoing embodiments. In a main section of the first gas piping line 25 extending to the oxygen gas delivery port 25A, a flow rate controller 83 and a manual valve 84 are provided on opposite sides of the pressure retaining valve 28. A flow rate controller 85 is provided in a leakage branch of the first gas piping line 25.

Disposed at the top of the hydrogen compartment 82 in the container 7 is a hydrogen gas outlet 86 to which a second gas piping line 41 is connected for channeling hydrogen gas to the hydrogen gas delivery port 41A. The second gas piping line 41 has a gas dryer 42, a combustible gas sensor 43, and a pressure retaining valve 44, a third gas pressure sensor 46, a leak valve 47 as in the foregoing embodiments. In a main section of the second gas piping line 41 extending to the hydrogen gas delivery port 41A, a flow meter 87 and a manual valve 88 are provided on opposite sides of the pressure retaining valve 44. It is noted that the drain conduits 31 and 48 connected to the gas dryers 26 and 42 are extended deeply into the oxygen and hydrogen compartments 81 and 82 of the container 7, respectively.

The flow meter 87 and the water level detecting and controlling device 36 of the second water level detector means 33 have outputs connected to a gas flow rate control unit 89 which has outputs connected to the flow rate controllers 83 and 85 for controlling them.

In the fourth embodiment shown in FIG. 4, oxygen and hydrogen gases generated in the electrolytic cell 1 are channeled through the oxygen and hydrogen outflow pipes 3 and 4 and accumulate in the upper spaces of the oxygen and hydrogen compartments 81 and 82, respectively. Since the oxygen and hydrogen compartments 81 and 82 are separated by the partition 80, no mixing occurs between oxygen and hydrogen gases. In a lower portion of the container 7, on the other hand, deionized water is continuous between the oxygen and hydrogen compartments 81 and 82. Then the oxygen gas accumulating in the upper space of the oxygen compartment 81 and the hydrogen gas accumulating in the upper space of the hydrogen compartment 82 are always kept at the same pressure. Therefore, no differential pressure is applied across the diaphragm or solid polymer electrolyte membrane separating the anode and the cathode in the electrolytic cell 1, the electrolyte membrane being free of failure by a differential pressure. Since the pressures in the anode and cathode compartments in the cell 1 and the pressure of deionized water outside the cell 1 are also always maintained equal, the differential pressure applied across the seals in the cell 1 is also zero. There is no risk of failure of the seals by a differential pressure and hence, no risk of leakage of hydrogen and oxygen gases from the cell 1 into the container 7.

The hydrogen and oxygen gas generating system according to the fourth embodiment of the invention is started by first manually opening the flow rate controller 85 and leak valve 47, manually opening the control valve 10 of the deionized water feed means 11, and actuating the feed pump 9 to pump deionized water into the container 7 until it is completely full of deionized water. During pumping, the levels of water in the oxygen and hydrogen compartments 81 and 82 of the container 7 are visually monitored by way of the level gauge 21 of the first water level detector means 20 and the level gauge 34 of the second water level detector means 33.

At this point, the manual valves 84, 88, flow rate controller 85, leak valve 47, and water feed control valve 10 are closed, and the pump 9 is interrupted. In this state, electric power is supplied from the DC power source 53 to the electrolytic cell 1 for effecting electrolysis of deionized water for generating oxygen and hydrogen gases. Oxygen and hydrogen gases are channeled to the oxygen and hydrogen compartments 81 and 82 to establish gas pressures therein. The pressure of hydrogen gas is detected by the gas pressure sensor 46. Since the container 7 is completely full of deionized water in the initial state, the hydrogen gas pressure rapidly increases and immediately reaches the preset pressure value. Then the gas pressure sensor 46 produces a pressure signal to the power regulator 52 to interrupt the DC power source 53.

In this state, the manual drain valve 91 is slightly opened to allow the deionized water in the container 7 to be forcibly discharged into the drain conduit 90. Then the water levels in the oxygen and hydrogen compartments 81 and 82 lower and accordingly, the pressures in the oxygen and hydrogen compartments 81 and 82 lower. The gas pressure sensor 46 and power regulator 52 then function to restart electric power supply from the DC power source 53 to the electrolytic cell 1 for restarting electrolysis of deionized water to generate oxygen and hydrogen gases again. As a consequence, deionized water in the container 7 is further displaced and discharged through the drain conduit 90 and the water levels in the oxygen and hydrogen compartments 81 and 82 lower further. When the water levels in the oxygen and hydrogen compartments 81 and 82 reach the predetermined levels (water levels for normal operation) in this way, the manual drain valve 91 is closed to prohibit further lowering of the water levels. The pressure of oxygen gas in the oxygen compartment 81 and the pressure of hydrogen gas in the hydrogen compartment 82 increase and reach the predetermined pressure values whereupon electrolysis of deionized water is interrupted. Then the manual valves 88 and 84 are opened to deliver hydrogen and oxygen gases to external destinations through the hydrogen and oxygen gas delivery ports 41A and 25A, respectively.

The flow rate of hydrogen gas delivered to the external destination is measured by the flow meter 87 in the second gas piping line 41 and based on that measurement, the gas flow rate control unit 89 controls the flow rate controller 83 such that the flow rate of the flow rate controller 83 in the first gas piping line 25 (that is, flow rate of oxygen gas) may be set at one half of the flow rate of hydrogen gas. If the actual flow rate of oxygen gas flowing through the flow rate controller 83 in the first gas piping line 25 does not reach the set value of flow rate although the flow rate controller 83 is fully opened, a flow rate corresponding to the difference between the set value of flow rate and the actual flow rate of oxygen gas is set in the flow rate controller 85 on the leakage branch. Then oxygen gas is leaked through the flow rate controller 85 at a flow rate corresponding to the difference between the set value of flow rate in the flow rate controller 83 and the actual flow rate of oxygen gas. As a result, the sum of the flow rate of oxygen gas delivered to the external destination from the oxygen gas delivery port 25A through the flow rate controller 83 in the first gas piping line 25 and the flow rate of oxygen gas leaked through the flow rate controller 85 in the same first gas piping line 25 is one half of the flow rate of hydrogen gas delivered to the external destination through the second gas piping line 41. As a whole, the flow rate of hydrogen gas and the flow rate of oxygen gas are maintained at a ratio of 2:1.

It is to be noted that even when the components are controlled to achieve the desired flow rate ratio of hydrogen to oxygen gas as mentioned above, an actual process encounters considerable errors, failing to correctly maintain the flow rate ratio at 2:1. In such a situation, either one of the water levels in the oxygen and hydrogen compartments 81 and 82 of the container 7 is above the water level for normal operation and the other is below the water level for normal operation. Then in the fourth embodiment of FIG. 4, the water level in the hydrogen compartment 82 is detected by the level sensor 35A to 35D of the second water level detector means 33. If the water level in the hydrogen compartment 82 is below the normal level, the water level detecting and controlling device 36 delivers a signal to the gas flow rate controller 89 which functions to reduce the set value of flow rate of the flow rate controller 83 or 85 in the first gas piping line 25, thereby reducing the total flow rate of oxygen gas. Inversely, if the water level in the hydrogen compartment 82 is above the normal level, the water level detecting and controlling device 36 delivers a signal to the gas flow rate controller 89 which functions to increase the set value of flow rate of the flow rate controller 83 or 85, thereby increasing the total flow rate of oxygen gas. As a result of continuously controlling the water levels substantially constant, the ratio in flow rate of hydrogen gas to oxygen gas is correctly controlled at 2:1.

On the other hand, the water level in the oxygen compartment 81 of the container 7 is detected by the level sensor 22A to 22D of the first water level detector means 20. In accordance with the detected water level, the water level detecting and controlling device 23 controls the pump 9 and the control valve 10 of the deionized water feed means 11. If the water level in the oxygen compartment 81 is below the normal level, deionized water is pumped into the container 7. Accordingly, deionized water is timely made up in the amount of deionized water consumed by electrolysis and hydrogen and oxygen gases can be delivered under the desired pressures.

In the foregoing description of the fourth embodiment shown in FIG. 4, the flow rate of oxygen gas is controlled by controlling the flow rate controller 83 or 85 of the first gas piping line 25 in accordance with the water level in the hydrogen compartment 82 detected by the second water level detector means 33, and the pumping of deionized water is controlled by controlling the deionized water feed means 11 in accordance with the water level in the oxygen compartment 81 detected by the first water level detector means 20. Inversely, it is acceptable in some cases that the pumping of deionized water is controlled by controlling the deionized water feed means 11 in accordance with the water level in the hydrogen compartment 82 detected by the second water level detector means 33, and the flow rate of oxygen gas is controlled by controlling the flow rate controller 83 or 85 of the first gas piping line 25 in accordance with the water level in the oxygen compartment 81 detected by the first water level detector means 20.

Although in the foregoing embodiments, the DC power source 53 is controlled by the power regulator 52 in accordance with the pressure of hydrogen gas by providing the third gas pressure sensor 46 in the hydrogen gas flowpath or second gas piping line 41, it is acceptable in some cases that the DC power source 53 is controlled by the power regulator 52 in accordance with the pressure of oxygen gas by providing the third gas pressure sensor 46 in the first gas piping line 25.

In the fourth embodiment of FIG. 4, the container 7 has a water cooling jacket structure and is loaded with the ion exchange resin 73 as in the third embodiment of FIG. 3. Instead, the fourth embodiment of FIG. 4 may employ a loop circuit arrangement as in the first embodiment of FIG. 1. That is, a loop circuit 15 having a pump 16, ion exchange resin column 17, heat exchanging chiller 18, and filter 19 incorporated therein may be provided for achieving cooling and purifying of deionized water within the loop circuit 15. Alternatively, the fourth embodiment of FIG. 4 may employ an arrangement as in the second embodiment of FIG. 2. That is, a deionized water circulation line 60 may be extended from the outlet 12 at the bottom of the container 7 to the communication port 2 of the electrolytic cell 1, and a water feed pump 16, an ion exchange resin column 17, heat exchanging chiller 18, and a filter 19 be incorporated in the circulation line 60 whereby cooled and purified water is pumped from the container 7 into the electrolytic cell 1 through the circulation line 60.

In the foregoing embodiments, the oxygen gas separating chamber 7A is provided above the container 7 as an upper portion thereof. Like the gas/liquid separator 32 for hydrogen gas, the oxygen gas separating chamber may be provided separately from the container 7. In this case, the oxygen gas outlet pipe 3 is extended outside the container 7 and connected to the oxygen gas separating chamber in the form of a gas/liquid separator. The discharge pipe may be directly connected to the container without an intervening valve.

In the foregoing description, the structure of the water electrolysis cell is not specified because any of well-known cell structures for water electrolysis may be used. Useful cells cover from a cell of simple structure using a single solid electrolyte membrane as a diaphragm to a cell of multilayer structure using a stack of several hundred solid electrolyte membranes as a diaphragm.

The hydrogen and oxygen gas generating system according to the invention can increase the pressures of hydrogen and oxygen gases, minimize the differential pressure applied across the diaphragm, typically solid polymer electrolyte membrane, separating the anode and cathode compartments of the electrolytic cell, prevent failure of the diaphragm which is vulnerable to pressure, prevent leakage of gas from the cell through seals, and therefore deliver hydrogen and oxygen gases under desirably high pressures without a need for gas compressors. The increased pressures of hydrogen and oxygen gases lead to additional advantages that the partial pressure of moisture as an impurity in the respective gases can be suppressed relatively low and the respective gases are available at higher purity. The hydrogen and oxygen gas generating system according to the invention can deliver hydrogen and oxygen gases to destinations of use in a stable safe manner as needed without a need for transporting or storing high pressure gases because the system can be located near the destinations of use.

We claim:

1. A hydrogen and oxygen gas generating system comprising a water electrolysis cell having anode and cathode compartments separated from one another by a diaphragm wherein deionized water is electrolyzed to generate oxygen and hydrogen gases in the anode and cathode compartments, respectively, an oxygen outflow pipe connected to the anode compartment of said electrolytic cell for channeling oxygen gas resulting from electrolysis upward from the anode compartment, a hydrogen outflow pipe connected to the cathode compartment of said electrolytic cell for channeling hydrogen gas resulting from electrolysis outward from the cathode compartment, a container which can be filled with deionized water, surrounding the electrolytic cell and supporting the cell submerged in deionized water, said container including an upper portion defining an oxygen gas separating chamber where an upper end of said oxygen outflow pipe opens, a deionized water feed means for feeding deionized water into said container, said cell further having a communication port at the bottom of the anode compartment for communication of deionized water between the cell interior and the container interior, a gas/liquid separator disposed outside said container and connected to the cathode compartment of said electrolytic cell through the hydrogen outflow pipe for receiving hydrogen gas, a first gas pressure detecting means for detecting the pressure of oxygen gas accumulating in an upper space of said oxygen gas separating chamber, a second gas pressure detecting means for detecting the pressure of hydrogen gas accumulating in an upper space of said gas/liquid separator, a first gas piping line for delivering outward the oxygen gas accumulating in an upper space of said oxygen gas separating chamber, a second gas piping line for delivering outward the hydrogen gas accumulating in an upper space of said gas/liquid separator, a gas pressure control means for controlling said first and second gas piping lines in accordance with the values of gas pressure detected by said first and second gas pressure detecting means, to control the pressure of oxygen gas accumulating in an upper space of said oxygen gas separating chamber and the pressure of hydrogen gas accumulating in an upper space of said gas/liquid separator, a DC power source for supplying electric power to said electrolytic cell, and a power regulator coupled to said DC power source for controlling the power supply to said electrolytic cell to control the pressure of hydrogen gas and the pressure of oxygen gas.

2. The system of claim 1 further comprising a first level detector means for detecting the level of water in said oxygen gas separating chamber, and means for actuating said deionized water feed means to feed deionized water into said container in accordance with the water level in the oxygen gas separating chamber detected by said first level detector means.

3. The system of claim 1 further comprising a second level detector means for detecting the level of water in said gas/liquid separator, and means for discharging water accumulated in said gas/liquid separator in accordance with the water level in said gas/liquid separator detected by said second level detector means.

4. The system of claim 1 further comprising a second level detector means for detecting the level of water in said gas/liquid separator, a discharge conduit connected between said gas/liquid separator and said container for discharging water accumulated in said gas/liquid separator therethrough, a pump disposed in said discharge conduit for pumping water from said gas/liquid separator to said container, and means for actuating said pump in accordance with the water level in said gas/liquid separator detected by said second level detector means.

5. The system of claim 1 further comprising a second level detector means for detecting the level of water in said gas/liquid separator, a discharge conduit connected between said gas/liquid separator and said container for discharging water accumulated in said gas/liquid separator therethrough, a valve disposed in said discharge conduit, and means for opening and closing said valve in accordance with the water level in said gas/liquid separator detected by said second level detector means, said gas pressure control means functioning such that the pressure of hydrogen gas accumulating in an upper space of said gas/liquid separator may be higher than the pressure of oxygen gas accumulating in an upper space of said oxygen gas separating chamber.

6. The system of claim 1 wherein said gas pressure control means functions such that the difference between the pressure of oxygen gas accumulating in an upper space of said oxygen gas separating chamber and the pressure of hydrogen gas accumulating in an upper space of said gas/liquid separator may fall within a predetermined range.

7. A hydrogen and oxygen gas generating system comprising a water electrolysis cell having anode and cathode compartments separated from one another by a diaphragm wherein deionized water is electrolyzed to generate oxygen and hydrogen gases in the anode and cathode compartments, respectively, an oxygen outflow pipe connected to the anode compartment of said electrolytic cell for channeling oxygen gas resulting from electrolysis upward from the anode compartment, a hydrogen outflow pipe connected to the cathode compartment of said electrolytic cell for channeling hydrogen gas resulting from electrolysis upward from the cathode compartment, a container which can be filled with deionized water, surrounding the electrolytic cell and supporting the cell submerged in deionized water, said container including a partition for dividing an upper portion of said container into oxygen and hydrogen compartments in a fluid tight manner to prevent any gas leakage therebetween, upper ends of said oxygen and hydrogen outflow pipes opening in said oxygen and hydrogen compartments, respectively, a deionized water feed means for feeding deionized water into said container, said cell further having a communication port at the bottom of the anode compartment for communication of deionized water between the cell interior and the container interior, a first level detector means for detecting the level of water in said oxygen compartment, a second level detector means for detecting the level of water in said hydrogen compartment, a first gas piping line for delivering outward the oxygen gas accumulating in an upper space of said oxygen compartment, said first gas piping line having one flow controller for controlling the flow rate of outward oxygen gas flow and said first gas piping line including a branch for leaking oxygen gas and another flow controller in the branch for controlling the flow rate of leaking oxygen gas flow, a second gas piping line for delivering outward the hydrogen gas accumulating in an upper space of said hydrogen compartment, said second gas piping line having a flow meter for measuring the flow rate of hydrogen gas, a gas flow rate control means for controlling at least one of the flow controllers of said first gas piping line in accordance with a measurement of the flow meter of said second gas piping line and controlling the other flow controller in the branch of said first gas piping line in accordance with the water level detected by said second or first level detector means, said deionized water feed means being actuated to feed deionized water into said container in accordance with the water level detected by said first or second level detector means, a DC power source for supplying electric power to said electrolytic cell, and a power regulator coupled to said DC power source for controlling the power supply to said electrolytic cell in accordance with the pressure detected by a gas pressure detecting means in said second or first gas piping line to control the gas pressure.

8. The system of claim 1 or 7 wherein said gas flow rate control means controls such that the total flow rate of oxygen gas through the one and other flow controllers of said first gas piping line may be one half of the flow rate of hydrogen gas through said second gas piping line.

9. The system of claim 1 or 7 further comprising a loop connected to said container and having a pump, a heat exchanger, an ion exchanger, and a filter arranged in series for circulating deionized water between said container and the loop.

10. The system of claim 1 or 7 further comprising a deionized water supply line connected to an outlet port of said container and the communication port of said electrolytic cell and having a pump, a heat exchanger, an ion exchanger, and a filter arranged in series for supplying deionized water from said container to said cell through the supply line.

11. The system of claim 1 or 7 further comprising a cooling means embracing said container for cooling said container with coolant.

12. The system of claim 1 or 7 wherein each of said first and second gas piping lines includes a pressure retaining means which opens to allow gas flow when the applied pressure is not lower than a preset value and closes to prevent gas flow when the applied pressure is lower than the preset value.

13. The system of claim 1 or 7 wherein said container is loaded with an ion exchange resin.

14. The system of claim 1 or 7 wherein at least one of said first and second gas piping lines includes a gas dryer.

15. The system of claim 1 or 7 wherein said diaphragm is a membrane of a solid polymer electrolyte.

16. The system of claim 1 or 7 wherein said container is made of stainless steel with a passivated oxide film formed on the inner surface thereof.

* * * * *